United States Patent
Olinsky et al.

(10) Patent No.: US 11,106,537 B2
(45) Date of Patent: *Aug. 31, 2021

(54) IOT DEVICE UPDATE FAILURE RECOVERY

(71) Applicant: Microsoft Technology Licensing, LLC, Redmond, WA (US)

(72) Inventors: Reuben R. Olinsky, Seattle, WA (US); Edmund B. Nightingale, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/441,849

(22) Filed: Jun. 14, 2019

(65) Prior Publication Data

US 2019/0294503 A1 Sep. 26, 2019

Related U.S. Application Data

(63) Continuation of application No. 15/444,108, filed on Feb. 27, 2017, now Pat. No. 10,402,273.

(Continued)

(51) Int. Cl.
*G06F 11/00* (2006.01)
*G06F 11/14* (2006.01)

(52) U.S. Cl.
CPC ...... *G06F 11/1433* (2013.01); *G06F 2201/83* (2013.01); *G06F 2201/84* (2013.01)

(58) Field of Classification Search
CPC ............ G06F 11/1433; G06F 11/1402; G06F 11/1441; G06F 11/1446; G06F 11/1448;

(Continued)

(56) References Cited

U.S. PATENT DOCUMENTS

2005/0132351 A1* 6/2005 Randall ............... G06F 11/1433
717/168
2007/0073978 A1* 3/2007 Lee ......................... G06F 8/65
711/141

(Continued)

FOREIGN PATENT DOCUMENTS

CN 103201746 A 7/2013
CN 103209179 A 7/2013

(Continued)

OTHER PUBLICATIONS

"Final Office Action Issued in U.S. Appl. No. 15/443,912", dated Oct. 30, 2019, 6 Pages.

(Continued)

*Primary Examiner* — Joseph D Manoskey
(74) *Attorney, Agent, or Firm* — Davin Chin; Chin IP, PLLC

(57) ABSTRACT

The disclosed technology is generally directed to IoT device update failure recovery. In one example of the technology, after writing an updated release to memory, a determination is made whether the updated release is valid. The updated release includes a plurality of image binaries. If the updated release is determined to be valid, the updated release is made the current release. A determination is made as to whether the current release is stable. Upon determining that the current release is unstable, an auto-rollback is performed. Performing the auto-rollback includes, via at least one processor, automatically: obtaining an uncompressed backup of a previous release; making the uncompressed backup of the previous release the current release; and executing the uncompressed backup.

20 Claims, 6 Drawing Sheets

Related U.S. Application Data

(60) Provisional application No. 62/434,323, filed on Dec. 14, 2016.

(58) Field of Classification Search
CPC .. G06F 11/1469; G06F 11/3604; G06F 8/658; G06F 8/63; G06F 8/65; G06F 8/71; G06F 2201/83; G06F 2201/84; H04L 67/34; H04L 69/40; H04W 4/70; H04W 4/50
See application file for complete search history.

(56) References Cited

U.S. PATENT DOCUMENTS

| | | | |
|---|---|---|---|
| 2007/0169075 A1* | 7/2007 | Lill | G06F 8/61 717/168 |
| 2009/0259798 A1 | 10/2009 | Wang et al. | |
| 2014/0066015 A1* | 3/2014 | Aissi | G06F 21/57 455/411 |
| 2015/0039872 A1* | 2/2015 | Jorden | G06F 8/60 713/1 |
| 2017/0075677 A1* | 3/2017 | Gross | H04B 3/52 |
| 2017/0139777 A1 | 5/2017 | Gehrmann | |
| 2017/0185781 A1 | 6/2017 | Kim | |
| 2017/0322790 A1* | 11/2017 | Surdu | G06F 21/105 |
| 2017/0364685 A1 | 12/2017 | Shah et al. | |
| 2018/0081669 A1 | 3/2018 | Becker et al. | |
| 2020/0012492 A1 | 1/2020 | Bonar et al. | |

FOREIGN PATENT DOCUMENTS

| | | |
|---|---|---|
| CN | 103609059 A | 2/2014 |
| CN | 105282732 A | 1/2016 |

OTHER PUBLICATIONS

"Non Final Office Action Issued in U.S. Appl. No. 16/566,355", dated Jul. 24, 2020, 19 pages.

"Final Office Action Issued in U.S. Appl. No. 15/629,622", dated Dec. 20, 2019, 13 Pages.

"Notice of Allowance Issued in U.S. Appl. No. 16/566,355", dated Nov. 4, 2020, 11 Pages.

"First Office Action and Search Report Issued in China Patent Application No. 201780076889.3", dated May 17, 2021, 11 Pages.

* cited by examiner

IOT DEVICE UPDATE FAILURE RECOVERY

CROSS-REFERENCE TO RELATED APPLICATION(S)

This application is a continuation of U.S. patent application Ser. No. 15/444,108, filed Feb. 27, 2017, entitled "IOT DEVICE UPDATE FAILURE RECOVERY", which claims priority to U.S. Provisional Pat. App. No. 62/434,323, filed Dec. 14, 2016, entitled "IOT DEVICE UPDATE FAILURE RECOVERY". The entirety of each of these afore-mentioned applications is incorporated herein by reference.

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to IoT device update failure recovery. In one example of the technology, after writing an updated release to memory, a determination is made whether the updated release is valid. In some examples, the updated release includes a plurality of image binaries. If the updated release is determined to be valid, the updated release is made the current release. A determination is made as to whether the current release is stable. Upon determining that the current release is unstable, an auto-rollback is performed. In some examples, performing the auto-rollback includes, via at least one processor, automatically: obtaining an uncompressed backup of a previous release; making the uncompressed backup of the previous release the current release; and executing the uncompressed backup.

In examples of the disclosure, IoT devices are updated securely and are updated in such a way that the IoT device updates are both self-managing and robust to failures. In some examples, upon detection of an update failure, self-managing update failure recovery occurs, for which the exact process may vary depending on the type of update failure detected. For instance, in some failures, upon detection of a "buggy" update, auto-rollback is performed.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
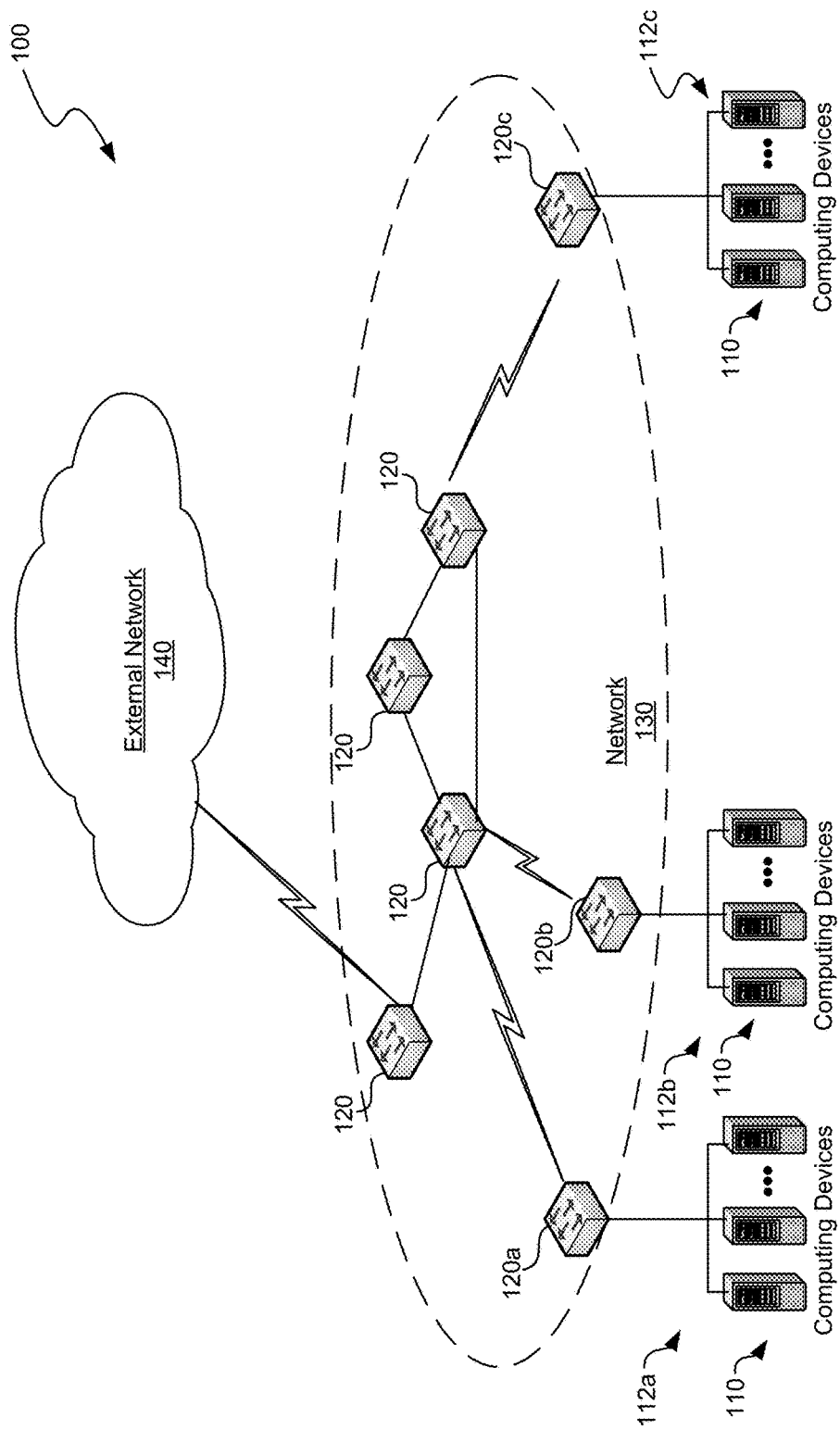
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to IoT device update failure recovery. In one example of the technology, after writing an updated release to memory, a determination is made whether the updated release is valid. In some examples, the updated release includes a plurality of image binaries. If the updated release is determined to be valid, the updated release is made the current release. A determination is made as to whether the current release is stable. Upon determining that the current release is unstable, an auto-rollback is performed. In some examples, performing the auto-rollback includes, via at least one processor, automatically: obtaining an uncompressed backup of a previous release; the uncompressed backup of the previous release is made the current release; and executing the uncompressed backup.

In examples of the disclosure, IoT devices are updated securely and are updated in such a way that the IoT device updates are both self-managing and robust to failures. In some examples, upon detection of an update failure, self-managing update failure recovery occurs, for which the exact process may vary depending on the type of update failure detected. For instance, in some failures, upon detection of a "buggy" update, auto-rollback is performed. In some examples, the IoT device update is robust to a variety of different type of failures including corruption, forgeries, bugs, erratic behavior, and/or the like.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a device that comprises part or all of an IoT hub, a device comprising part or all of an application back-end, or the like, as discussed in greater detail below.

Illustrative Computing Device

Figure 2:
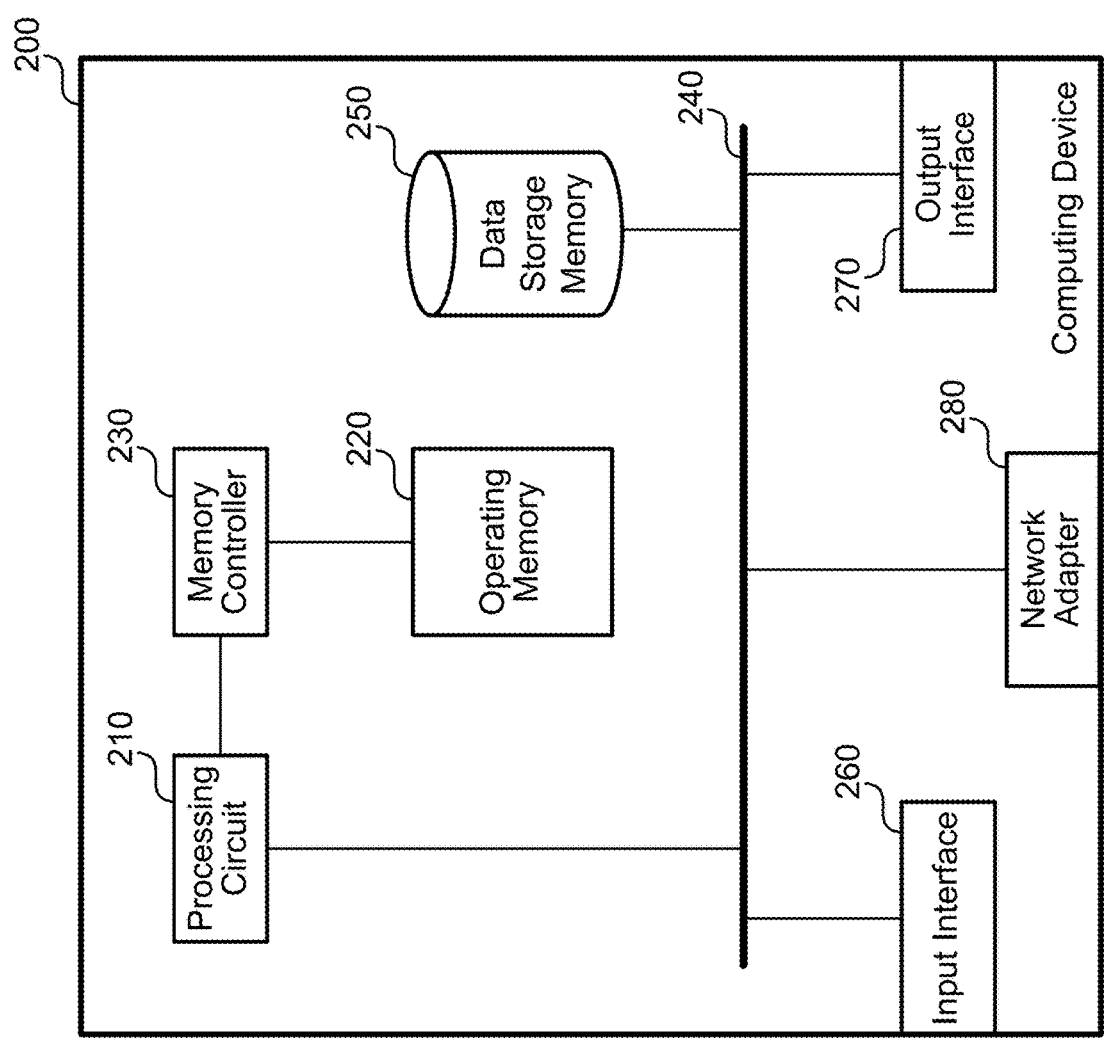
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 24o as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Figure 4A:
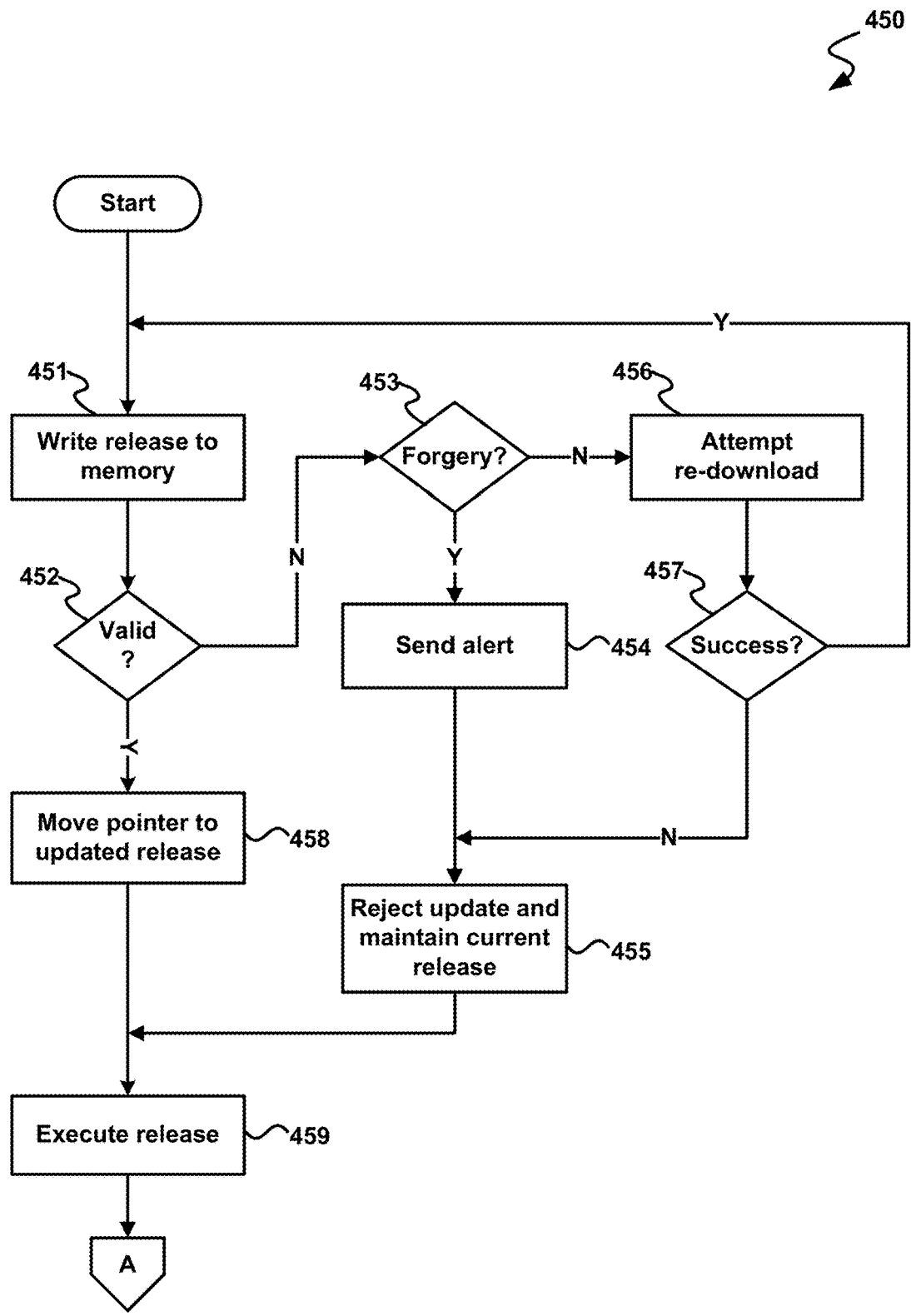
FIGS. 4A-4B are a logical flow diagram illustrating an example of a process for IoT device failure update recovery.
Figure 4B:
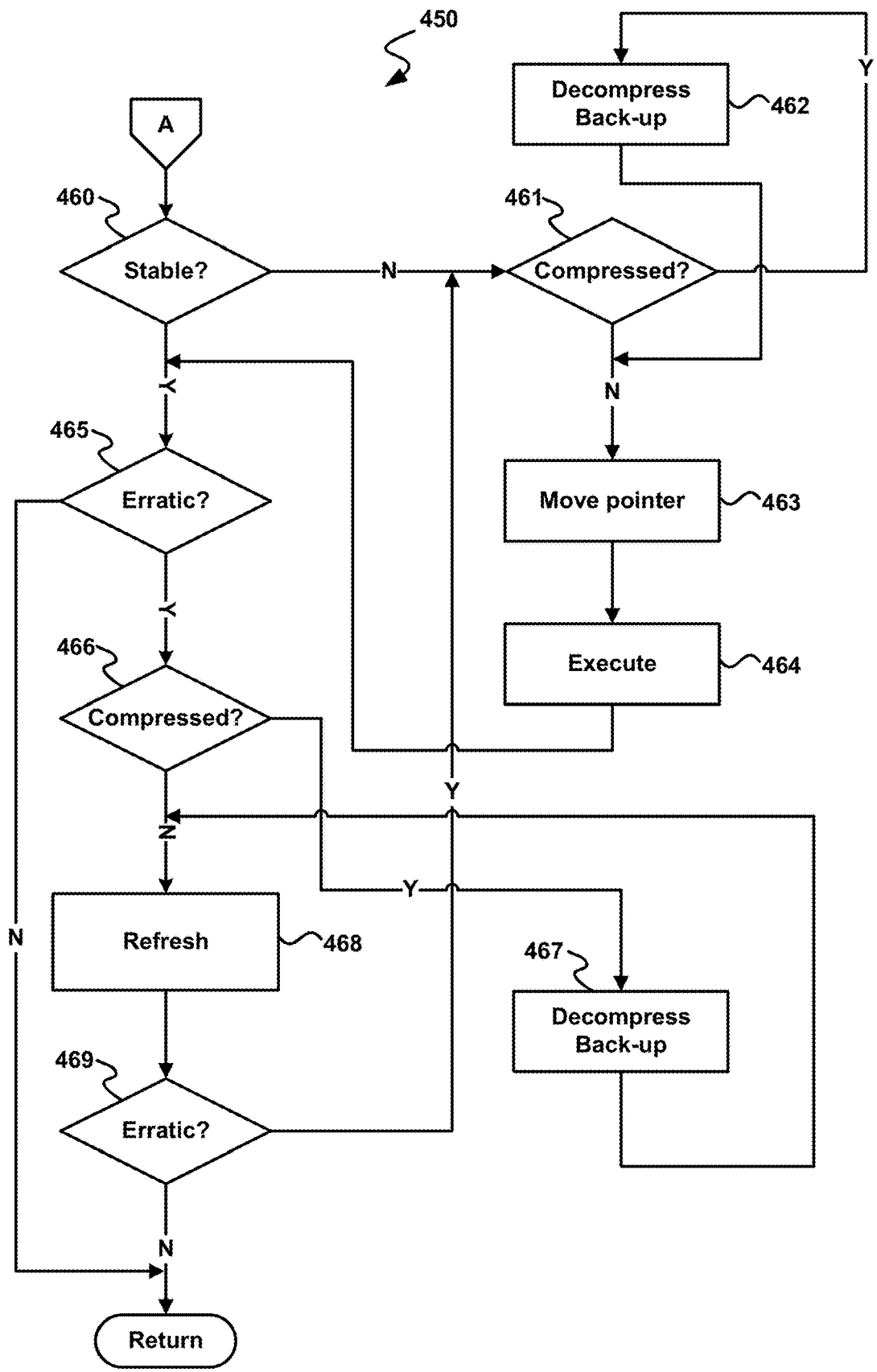
Figure 5:
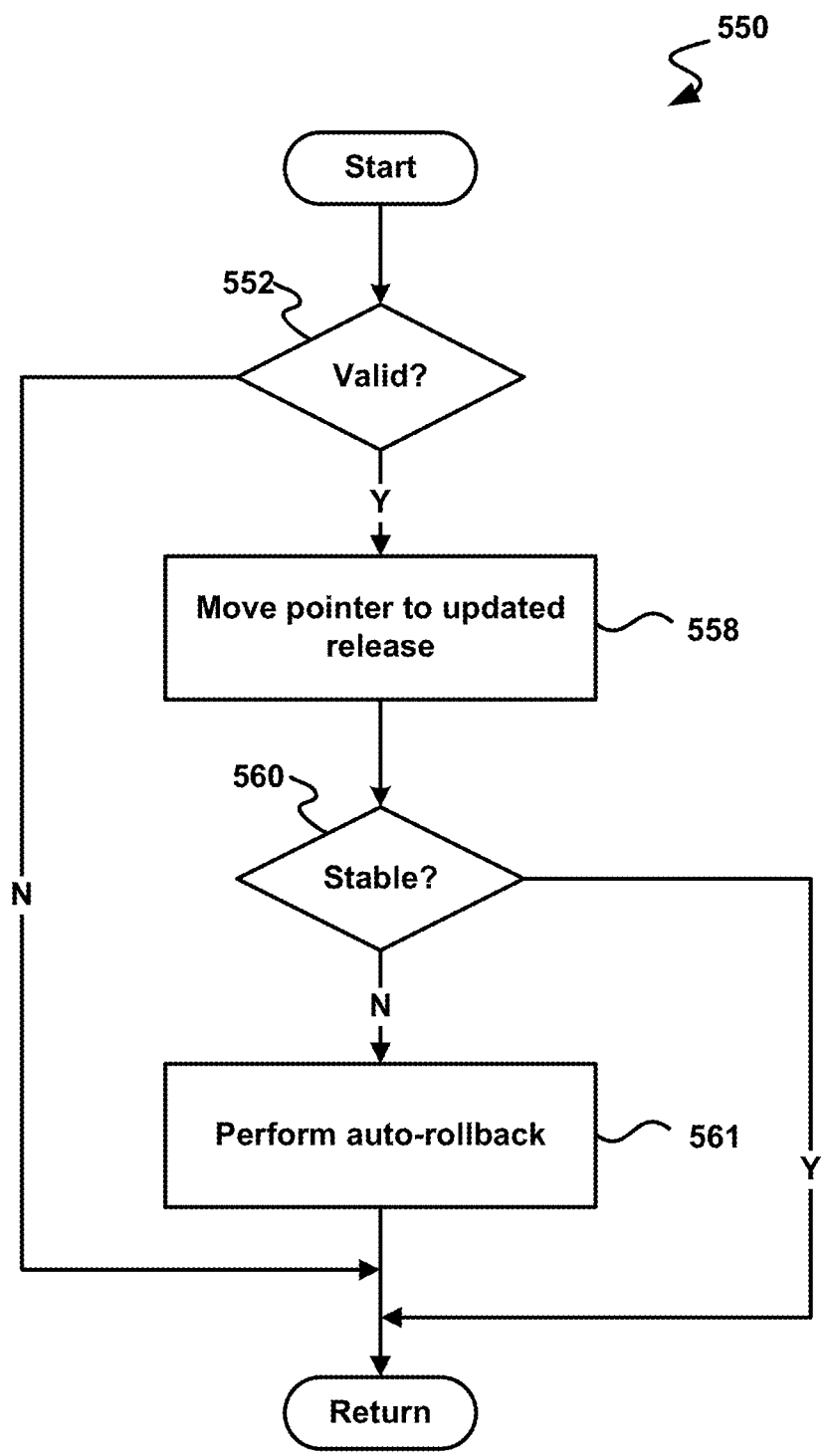
FIG. 5 a logical flow diagram illustrating another example of a process for IoT device failure update recovery, in accordance with aspects of the present disclosure.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions, such as the actions of the process of FIGS. 4A-4B or the process of FIG. 5 in some examples.

Illustrative Systems

Figure 3:
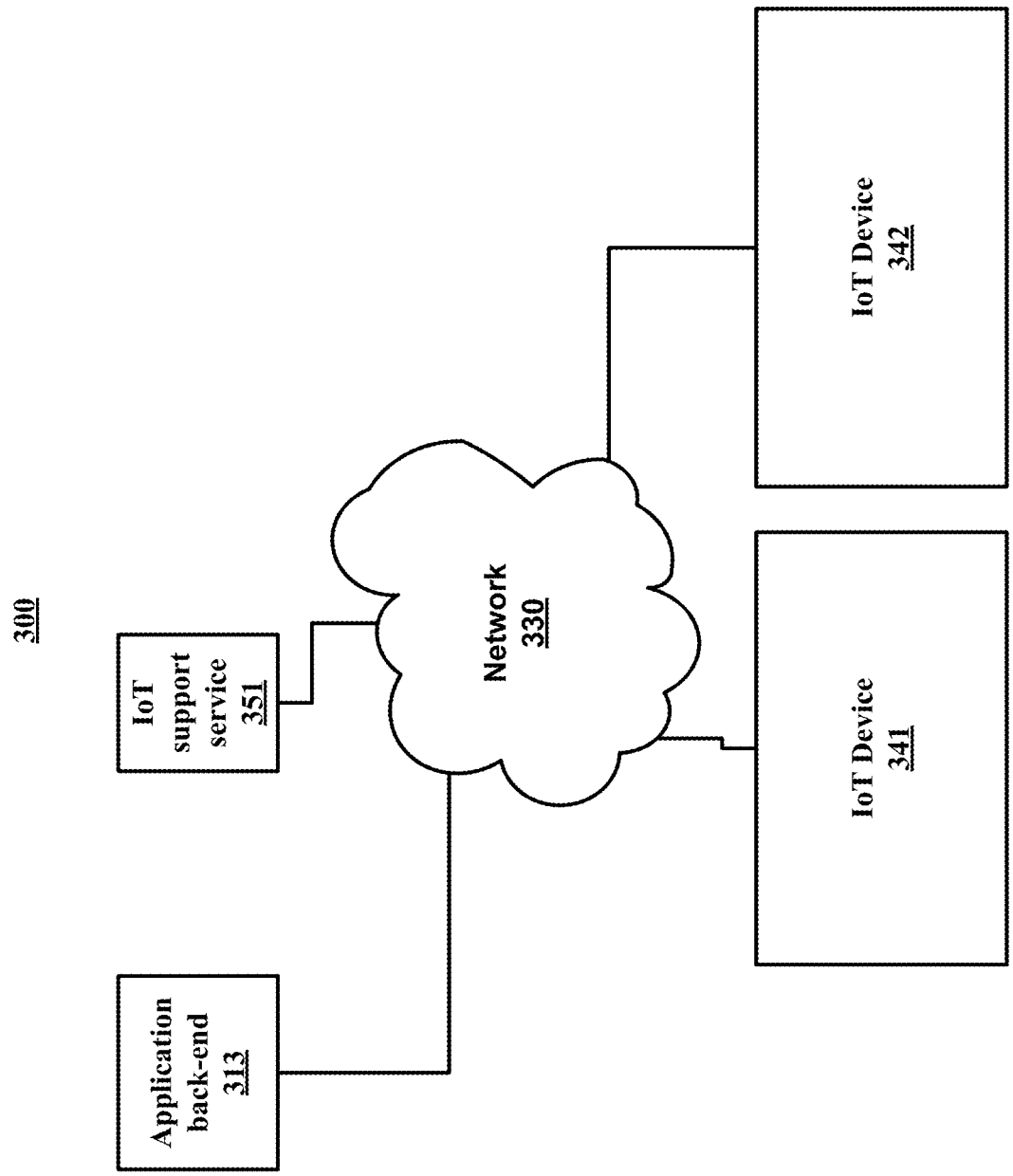
FIG. 3 is a block diagram illustrating an example of a system.

FIG. 3 is a block diagram illustrating an example of a system (300) for IoT data control. System 300 may include network 330, IoT support service 351, IoT devices 341 and 342, and application back-end 313, which all connect to network 330o. The term "IoT device" refers to a device intended to make use of IoT services. An IoT device can include virtually any device that connects to the cloud to use IoT services, including for telemetry collection or any other purpose. IoT devices include any devices that can connect to a network to make use of IoT services. IoT devices can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. The IoT services for the IoT devices can be used for device automation, data capture, providing alerts, personalization of settings, IoT device updates, and numerous other applications.

Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. In some examples, at least some of the actions taken by the application back-end may be performed by applications running in application back-end 313.

The term "IoT support service" refers to a device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service.

Each of the IoT devices 341 and 342, and/or the devices that comprise IoT support service 351 and/or application back-end 313 may include examples of computing device 200 of FIG. 2. The term "IoT support service" is not limited to one particular type of IoT service, but refers to the device to which the IoT device communicates, after provisioning, for at least one IoT solution or IoT service. That is, the term "IoT support service," as used throughout the specification and the claims, is generic to any IoT solution. The term IoT support service simply refers to the portion of the IoT solution/IoT service to which provisioned IoT devices communicate. In some examples, communication between IoT devices and one or more application back-ends occur with an IoT support service as an intermediary. The IoT support service is in the cloud, whereas the IoT devices are edge devices. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 330 includes any communication method by which information may travel between IoT support service 351, IoT devices 341 and 342, and application back-end 313. Although each device or service is shown connected as connected to network 330, that does not mean that each device communicates with each other device shown. In some examples, some devices/services shown only communicate with some other devices/services shown via one or more intermediary devices. Also, other network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341 and 342 are devices that are intended to make use of IoT services provided by the IoT support service, which, in some examples, includes one or more IoT support services, such as IoT support service 351. Application back-end 313 includes a device or multiple devices that perform actions in providing a device portal to users of IoT devices.

In some examples, one of more of IoT devices such as IoT devices 341 and 342 may include a chip that performs various functions for the IoT device. In some examples, the chip may be a microcontroller or the like. In some examples, the chip may be a hybrid chip that includes multiple cores, including, for instance, a microcontroller and a central processing unit (CPU).

Device updates for IoT devices such as IoT devices 341 and 342 may occur at various times. For example, applications, other software, and/or firmware on an IoT device may be updated. Updates may be communicated to the IoT devices (e.g., 341 and 342) from the IoT support service (e.g., IoT hub 351 or application back-end 313 or the like) via network 330. Device updates may be installed frequently in some examples.

System 300 may include more or less devices than illustrated in FIG. 3, which is shown by way of example only.

Device updates for IoT devices may occur frequently. For example, applications, other software, and/or firmware on IoT devices may be updated. An update may be composed of a set of binaries that are referred to as images or image binaries. In some examples, each image binary has an associated piece of metadata called an image metadata. In some examples, the image metadata may include the name of the image, version of the image, signature, and/or the like. In some examples, the image metadata is stored in the cloud, e.g., making it queryable.

In some examples, the image metadata is also embedded into the image binary itself, e.g., ensuring that any image binary is self-describing. This might be implemented by uploading the metadata as a separate file, with the service repackaging the image binary and metadata together. Alternatively, the metadata might be pre-packed inside of the image binary, and unpackaged by the service.

A hardware stock keeping unit (SKU) is used in some examples as part of the process of describing hardware update policy and allowing its efficient implementation. In some examples, hardware SKUs are not a unique identifier of a single chip or device. Rather, in these examples, the hardware SKU uniquely identifies a particular configuration (color, model, capabilities, country etc.) in which a device is sold. In one example, the hardware SKUs for each IoT device include a device SKU and a chip SKU. In some examples, there may be more than two descriptive SKUs such that three or more types of SKUs provide a hierarchy of three or more levels. The chip SKU may define the particular type of chip that is running within the IoT device and the capabilities of the chip. A serial number, public key, or device ID may be used to uniquely identify a single instance of a chip.

The device SKU may be used as an identifier that describes a type of IoT device that uses a chip. The SKU might be the SKU used by a product manufacturer that identifies a particular model and configuration in its product line. Each device SKU may have a set of attributes that describe features that are software dependent. In addition, every device SKU may have an attribute describing a unique chip SKU that all devices with this device SKU contain. These attributes may also be defined and stored in the IoT service solution within the SKU registries. The attributes may also describe features that the manufacturer uses to differentiate models of IoT devices from one another (i.e., washer vs dryer, tan vs. stainless steel), but also small differences (the hardware SKU for the motor used, the type of LED panel connected to the 4×4 chip) that compose the IoT device. In some examples, there are two SKU registries; one registry for device SKUs and another registry for chip SKUs.

A release describes binary content that can be made available to a device. A release is a coherent set of image binaries for some targets. In some examples, a release is composed of at least four different entities: a set of image binaries, a single SKU, a component ID, and a semantic version. In some examples, each IoT device has at least two different releases installed on it. In some examples, a component ID collects all images that apply to a single component. A release may be coherent in that a release is pre-tested to ensure that all of the binaries in the release work together.

In some examples, releases are not made available to IoT devices until they are deployed. In some examples, deployments bundle a set of releases with a set of constraints defining the properties of devices the deployment is intended for. In some examples, after a deployment is registered and activated, it is included in queries when ultimately calculating which releases are intended for an IoT device.

In some examples, to begin the update process, a software engineer registers and uploads new image binaries from a local machine to an IoT update service associated with the IoT support service for the IoT devices. In some examples, the uploaded image binaries should be signed, because the image binaries will only be validated if the image binaries are signed. In some examples, image signing allows each image binary to be authenticated as being signed by a trusted entity.

In some examples, the software engineer may also define new releases around a particular SKU and register them with the IoT update service. The engineer may also be able to increment the release version number, compose a set of image binaries for the next version of a release, confirm that the composed image binaries meet all of the constraints provided by each image's metadata, and receive suggestions for constraint-compatible image binaries. For any given release, the software engineer may be able to use query tools to see the set of IoT devices for which the release is currently used, used as a backup, or made available. Further, the engineer may be able to query a particular device group and determine which set of deployments and releases the group is currently using.

Once a new release is defined, an engineer may target that release at a set of machines by defining a deployment. An engineer may target a single SKU (across releases), or target all SKUs that are dependent on an image binary that was recently updated. After a deployment is activated it may be made available to IoT devices when the IoT devices next check for updates. In the normal case an IoT device may make a request for services to send it which releases it should currently have on some regular cadence (e.g., weekly). The engineer may also proactively request devices immediately make this request rather than on the regular cadence.

In some examples, the cloud services are capable of initiating both upgrades and downgrades in the release. In some examples, the cloud can force IoT devices to rollback to an old release. As discussed in greater detail below, in some examples, the IoT devices include backup copies of previous updates. In some examples, the cloud can force an IoT device to downgrade to a previous update release that is stored as a backup copy on the IoT device.

In some examples, when a release is made available to a group of IoT devices via a deployment, it will not be made available to all IoT devices in the group simultaneously. Instead, in these examples, each release is made available in a rolling deployment. For example, a rolling deployment may start by deploying to a small subset of targeted IoT devices. As updates complete successfully, the number of IoT devices eligible for deployment increases.

In some examples, one or more of the IoT devices each include a daemon that sends a query to a cloud service (e.g., IoT support service) as to whether or not there is a currently available new device update for the IoT device. Next, the NW daemon on the IoT device may receive, from the cloud service, information related to an update for the IoT device. In some examples, the information includes an indication of the release that the IoT device should be on, and includes metadata associated with the indicated release, such as the semantic version, and metadata associated with each image binary in the indicated release such as an ID, a version, and the like. In some examples, secure transmission is used in the communication between the IoT device and the cloud service.

In some cases, upon receiving the indication related to the update for the IoT device, the IoT device validates the update. In some examples, the IoT device validates the update by validating that the update is properly signed. In some examples, the IoT device also confirms whether a new version should be downloaded by comparing the image binaries to be installed for the update against what is already installed in the IoT device. In some examples, the IoT device then determines which image binaries should be downloaded from the cloud service to ultimately be installed as part of the update process. In some examples, for each image binary that the IoT device determined should be downloaded from the cloud service, the daemon sends a corresponding request to the cloud service to download the image binary. In some examples, the cloud service sends to the daemon the location of each download in response to a request for the location of each image binary, and then the daemon sends requests to the indicated locations to download each image binary.

In some examples, the IoT device then receives the requested image binaries from the cloud service. In some examples, there is insufficient RAM on the IoT device to store the image binaries in memory, and so instead each image binary is streamed to the IoT device. The total set of image binaries received by the IoT device comprise a release. In some examples, secure transmission is used between the cloud service and the IoT device.

In some examples, the IoT device saves at least one back-up copy of the release, in addition to the primary copy. In some examples, the IoT device saves at least one back-up copy of at least a portion of the previous release. In some examples, the IoT device saves at least one back-up copy of the previous release, as well as at least one back-up copy of each of the N previous "critical" releases. In some examples, some or all of the back-up copies are compressed, and in some examples, some or all of the back-up copies are uncompressed. For instance, in some examples, for an updated application in which the application is execute-in-place (XiP) in flash, the primary copy to be executed in flash memory is uncompressed on flash memory, and two compressed back-up copies are saved.

In some examples, from one release to another, some images are changed and some are unchanged, and the images that are unchanged are not backed up. In some examples, the backed-up images are encrypted.

Next, the IoT device updates to the received release in a way that is self-managing and which is robust to failures in the IoT device update. One example of such a process is described in FIGS. 4A-4B below, and another example of such a process is described in FIG. 5 below.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

FIGS. 4A-4B are a logical flow diagram illustrating an example dataflow for a process (450) for IoT device update failure recovery. FIGS. 4A-4B and the corresponding description of FIGS. 4A-4B in the specification illustrate an example process for illustrative purposes that do not limit the scope of the disclosure. In some examples, process 450 is employed by an IoT device, such as IoT device 341 or 342 of FIG. 3, upon a new updated release being received by the IoT device from a cloud service. In some example, the updated release includes a plurality of image binaries.

FIGS. 4A-4B illustrate an example in which the updated release includes a single image for purposes of clarifying a relatively simple example. However, other examples include multiple images in a release.

In the illustrated example, first, step 451 occurs. At step 451, the IoT devices may write the updated release to memory (e.g., to flash memory in some examples). Next, the process proceeds to decision block 452. At decision block 452, in some examples, a determination is made as to whether or not the updated release is valid. In some examples, the determination is a signature check that includes comparing, for each image binary in the updated release, the signature on the image binary with the corresponding signature indicated in the metadata for the image binary.

If it is determined at decision block 452 that the release is not valid, the process moves to decision block 453. At decision block 453, in some examples, a determination is made as to whether or not the updated release is a forgery. In some examples, the determination at decision block 453 includes a checksum verification. If at decision block 453 it is determined that the updated release is a forgery, the process advances to block 454. At block 454, an alert is sent to the user warning the user of the forged release. Step 454 is optional, and in some examples no alert is sent. The process then proceeds to block 455. At block 455, in some examples, the update is rejected and the current release is maintained. In some examples, the IoT device notifies the cloud service that the update is rejected. The process then proceeds to block 459.

Returning to decision block 453, if at decision block 453 it is determined that the updated release is not a forgery, the process moves to block 456. In some examples, in essence, if the updated release is valid but not a forgery, the updated release is regarded as a corrupted release or the like. At block 456, an attempt to re-download the release from the cloud service is made. The process then moves to decision block 457. At decision block 457, a determination is made as to whether the re-download attempt was successful. If so, the process moves to block 451, where the re-downloaded release is written into memory. If instead the download attempt is unsuccessful, the process proceeds to block 455. The download attempt is optional, and in some examples, no attempt to re-download is made, and the process instead moves from decision block 453 directly to block 455.

Returning to decision block 452, if it was determined at decision block 452 that the updated release is valid, the process moves to block 458. At block 458, in some examples, the updated release is made the current release. In some examples, this is accomplished by moving the primary pointer to the updated release, so that the updated release becomes the current release. The process then advances to block 459. At block 459, in some examples, the IoT device begins execution of the current release.

The process then proceeds to decision block 460. At decision block 460, in some examples, a determination is made as to whether the current release is stable. In some examples, the determination at decision block 460 is a determination as to whether or not the current release is a "buggy" release-if the current release is not stable, it is a "buggy" release. As one example of a "buggy" release, a release may have been determined to be valid prior to moving the pointer, but upon execution of the release, the release starts to crash. The determination as to whether the release is stable may be made via monitoring or some other suitable mechanism. If it is determined that the current release is stable (e.g., that the current release is not a "buggy" release), the process advances to decision block 465.

If instead it is determined the current release is not stable (e.g., that the current release is a "buggy" release), the process moves to decision block 461. At decision block 461, a determination may be made as to whether or not the back-up of the saved release prior to the current release is compressed or not. If the saved backup of the previous release is compressed, the process proceeds to block 462. If instead the saved backup of the previous release is not compressed, the process advances to block 463. At block 462, the saved backup of the previous release may be decompressed. In some examples, the backup may also be encrypted, and the backup is also decrypted at block 462. The steps 461 and 462 together may comprise obtaining an uncompressed backup of the previous release. In some examples the saved backup is already uncompressed, and so the saved uncompressed backup is obtained, and in other examples the saved backup is compressed, and so the saved compressed backup is de-compressed to obtain an uncompressed backup of the previous release.

The process then proceeds to block 463. At block 463, in some examples, the uncompressed backup of the previous release is made the current release. In some examples, this is accomplished by moving the primary pointer to the uncompressed backup of the previous release. The process then moves to block 464. At block 464, in some examples, the uncompressed backup of the previous release is executed. In some examples, the steps at block 461-464 are performed automatically by a processor and in a self-managing manager, and comprise performing an auto-rollback. The process then advances to decision block 465.

At decision block 465, in some examples, a determination is made as to whether the current release is erratic. As an example of an erratic update, a release may have been stable for some time, but then may eventually exhibits erratic behavior. Erratic behavior may include the release not running after being stable on the IoT device for some time, or may include any of variety of erratic behaviors occurred after being stable on the IoT device for some time. If it is determined that the current release is not erratic, then the process proceeds to a return block, where other processing is resumed. If instead it is determined that the current release is erratic, the process moves to decision block 466.

At decision block 466, a determination may be made as to whether or not the back-up of the saved release prior to the current release is compressed or not. If the saved backup of the previous release is not compressed, the process proceeds to block 468. If instead the saved backup of the previous release is compressed, the process advances to block 467. At block 467, the saved backup of the previous release may be decompressed. In some examples, the saved backup may also be encrypted, and the saved backup is also decrypted at block 467. The process then proceeds to block 468. At block 468, the current release may be refreshed with the uncompressed backup of that release. The process then advances to decision block 469.

At decision block 469, a determination may be made as to whether the release remains erratic after the refresh. In some examples, if it is determined that the release is still erratic after the refresh, the process moves to decision block 461, where the erratic release is treated in a similar manner as a "buggy" release. If instead it is determined that the release is no longer erratic, the process proceeds to the return block.

The erratic behavior detected at decision block 465 may be caused in a variety of different manners. The "erratic" behavior may be similar to the "buggy" behavior discussed above, but at a different time—e.g., stability problems evident after updated may be detected at decision block 460, and stability problems evident after some time may be detected as erratic behavior at decision block 465. "Erratic" behavior in a release is defined herein as instability occurring at a time subsequent to the release being stable. In some examples, the erratic behavior may be caused by corrupted flash, an accidental flash write, a dependency problem, or the like. Some erratic behavior may be solved by performing a refresh, as done at block 468. If a refresh does not resolve the erratic behavior, then the erratic behavior is likely a result of a deeper problem than corrupted flash or the like, and in this case, the failure is treated in a similar manner as a "buggy" update in some examples.

As discussed above, FIGS. 4A-4B illustrate an example in which the release is a single image binary. In other examples, the release contains multiple image binaries. Examples with multiple image may be accomplished in a similar, albeit different manner. For instance, in some example in which a release contains multiple image binaries, image binaries are downloaded one at a time, and a signature check may be applied to each image binary. If the signature check fails, an attempt may be made to re-download the image binary for which the signature check failed, rather than re-downloading the entire release.

FIG. 5 is a logical flow diagram illustrating an example dataflow for a process (55o) for IoT device update failure recovery. After a start block, the process proceeds to decision block 552. At decision block 552, in some examples, after writing an updated release to memory, a determination is made as to whether the updated release is valid. In some examples, the updated release includes a plurality of image binaries. If the updated release is determined not to be valid, the process moves to a return block, where other processing is resumed. If instead the updated release is determined to be valid, the process moves to block 558.

At block 558, in some examples, the updated release is made the current release. In some examples, this is accomplished by moving a pointer is moved to the updated release so that the updated release becomes the current release. The process then advances to decision block 560. At decision block 560, in some examples, a determination is made as to whether the current release is stable. If it is determined that the current release is stable, the process proceeds to the return block. If instead it is determined that the updated release is unstable (i.e., not stable), the process moves to block 561. At block 561, an auto-rollback is performed. For instance, performing the auto-rollback may include, via at least one processor, automatically: obtaining an uncompressed backup of a previous release; moving the pointer to the uncompressed backup of the previous release; and executing the uncompressed backup. The process then advances to the return block.

In some examples, the IoT update failure recovery does not involve any steps or intervention by a user, but rather is entirely automatic and self-managing. In some examples, an operator of the cloud service may identify a severe bug or problem with the current release and force a rollback to a prior release to prevent the current release from causing damage or being exploited.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus for update failure recovery, comprising: a device including at least one memory adapted to store run-time data for the devices, and at least one processor that is adapted to execute processor-executable code that, in response to execution, enables the device to perform actions, including:
   after writing an updated release to memory, determining whether the updated release is valid, including validating a signature of a trusted entity on at least one image binary of the updated release, wherein the updated release includes a plurality of image binaries;
   if the updated release is determined to be valid, making the updated release the current release;
   after making the updated release the current release, determining whether the updated release is stable;
   if the updated release is determined to be unstable, performing an auto-rollback, wherein performing the auto-rollback includes automatically: obtaining an uncompressed backup of a previous release; making the uncompressed backup of the previous release the current release; and executing the uncompressed backup.

2. The apparatus of claim 1, the actions further including:
if the at least a portion of the updated release is determined to be invalid, rejecting at least the portion of the update.

3. The apparatus of claim 1, the actions further including:
beginning execution of the current release before determining whether the current release is stable.

4. The apparatus of claim 1, the actions further including:
determining whether the current release is erratic; and
if it is determined that the current release is erratic:
   obtaining an uncompressed backup of the current release, and refreshing the current release.

5. The apparatus of claim 4, the actions further including:
after refreshing the current release, determining whether the current release is still erratic; and
if it is determined that the current release is still erratic, performing an auto-rollback.

6. A method for update failure recovery, comprising:
after writing an updated release to memory, determining whether the updated release is valid, wherein the updated release includes a plurality of image binaries, and wherein determining whether the updated release is valid includes validating a signature of a trusted entity on at least one image binary of the plurality of image binaries;
if the updated release is determined to be valid, making the updated release the current release;
determining whether the current release is stable;
if the updated release is determined to be unstable, performing an auto-rollback, wherein performing the auto-rollback includes, via at least one processor, automatically: obtaining an uncompressed backup of a previous release; making the uncompressed backup of the previous release the current release; and executing the uncompressed backup.

7. The method of claim 6, further comprising:
if at least a portion of the updated release is determined to be invalid, rejecting the at least the portion of the update.

8. The method of claim 6, further comprising:
beginning execution of the current release before determining whether the current release is stable.

9. The method of claim 6, further comprising:
storing at least one backup copy for each previous update of a plurality of previous updates.

10. The method of claim 6, further comprising:
if the updated release is determined to be invalid, determining whether the updated release is a forgery;
if the updated release is determined to be a forgery, rejecting the update and maintaining the current release.

11. The method of claim 10, further comprising:
if the updated release is determined to be a forgery, sending an alert.

12. The method of claim 10, further comprising:
if the updated release is determined not to be a forgery attempting to re-download at least a portion of the updated release; and
if the attempt to re-download the current release is successful writing at least the portion of the updated release to memory; and
   determining whether the re-downloaded portion of the updated release is valid
else
   rejecting the update and maintaining the current release.

13. The method of claim 10, further comprising:
if the updated release is determined not to be a forgery, rejecting the update and maintaining the current release.

14. The method of claim 6, further comprising:
determining whether the current release is erratic; and
if it is determined that the current release is erratic:
   obtaining an uncompressed backup of the current release, and refreshing the current release.

15. The method of claim 14, further comprising:
after refreshing the current release, determining whether the current release is still erratic; and
if it is determined that the current release is still erratic, performing an auto-rollback.

16. A processor-readable storage medium, having stored thereon process-executable code for computer network design, that, upon execution by at least one processor, enables actions, comprising:
   after writing an updated release to memory, determining whether updated the release is valid, wherein the updated release includes a plurality of image binaries, and wherein determining whether the updated release is valid includes validating a signature of a trusted entity on each image binary of the plurality of image binaries;
   if the updated release is determined to be valid, making the updated release the current release;
   after making the updated release the current release, determining whether the updated release is stable;
   if the updated release is determined to be unstable, performing an auto-rollback, wherein performing the auto-rollback includes automatically: obtaining an uncompressed backup of a previous release; making the uncompressed backup of the previous release the current release; and executing the uncompressed backup.

17. The processor-readable storage medium of claim 16, the actions further comprising:
if at least a portion of the updated release is determined to be invalid, rejecting at least the portion of the update.

18. The processor-readable storage medium of claim 16, the actions further comprising:
   beginning execution of the current release before determining whether the current release is stable.

19. The processor-readable storage medium of claim 16, the actions further comprising:

determining whether the current release is erratic; and if it is determined that the current release is erratic:
   obtaining an uncompressed backup of the current release, and refreshing the current release.

20. The processor-readable storage medium of claim 19, the actions further comprising:

after refreshing the current release, determining whether the current release is still erratic; and if it is determined that the current release is still erratic, performing an auto-rollback.

* * * * *